(12) United States Patent
Marupaduga

(10) Patent No.: US 11,737,075 B1
(45) Date of Patent: Aug. 22, 2023

(54) DYNAMIC REALLOCATION OF TRANSMIT POWER ON DUAL CONNECTIVITY DEVICES

(71) Applicant: T-MOBILE INNOVATIONS LLC, Overland Park, KS (US)

(72) Inventor: Sreekar Marupaduga, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 503 days.

(21) Appl. No.: 17/030,054

(22) Filed: Sep. 23, 2020

(51) Int. Cl.
*H04W 72/044* (2023.01)
*H04W 52/24* (2009.01)
*H04W 52/22* (2009.01)
*H04L 5/00* (2006.01)

(52) U.S. Cl.
CPC ....... *H04W 72/0473* (2013.01); *H04L 5/0032* (2013.01); *H04W 52/221* (2013.01); *H04W 52/241* (2013.01)

(58) Field of Classification Search
CPC ........... H04W 72/0473; H04W 52/221; H04W 52/241; H04L 5/0032
See application file for complete search history.

(56) References Cited

U.S. PATENT DOCUMENTS

| | | | | |
|---|---|---|---|---|
| 11,546,862 | B2* | 1/2023 | Babaei | H04W 52/146 |
| 11,595,906 | B2* | 2/2023 | Dinan | H04L 5/0053 |
| 11,611,952 | B2* | 3/2023 | MolavianJazi | H04W 52/281 |
| 2017/0013565 | A1* | 1/2017 | Pelletier | H04W 52/367 |

OTHER PUBLICATIONS

Zander, Jens. "Performance of optimum transmitter power control in cellular radio systems." IEEE transactions on vehicular technology 41.1 (1992): 57-62. (Year: 1992).*

* cited by examiner

*Primary Examiner* — Sharad Rampuria
(74) *Attorney, Agent, or Firm* — Shook, Hardy & Bacon L.L.P.

(57) ABSTRACT

Systems and methods are provided for dynamically reallocating available transmit power on a dual connectivity user device. A retransmission rate is monitored for the user device that can simultaneously communicate using two or more wireless communication protocols. It is determined that the retransmission rate for the user device is above a threshold for communications using a first wireless communication protocol, such as LTE. Channel assignment of a second wireless communication protocol, such as 5G, is reduced, thus allowing the user device to reallocate a portion of the transmit power previously allocated for the second wireless communication protocol to the first wireless communication protocol to improve the retransmission rate for the first wireless communication protocol.

17 Claims, 5 Drawing Sheets

DYNAMIC REALLOCATION OF TRANSMIT POWER ON DUAL CONNECTIVITY DEVICES

The present disclosure is directed, in part, to optimizing transmit power allocation on a dual connectivity device, substantially as shown in and/or described in connection with at least one of the figures, and as set forth more completely in the claims.

According to various aspects of the technology, transmit power of a user device when communicating through a wireless communications network may be dynamically reallocated based on monitoring of packet drop and/or retransmission rate for that particular user device. More specifically, for a user device that is capable of communication using more than one wireless communication protocols, when that user's device's packet drop and/or retransmission rate is above a threshold, channel assignment associated with one of the wireless communication protocols may be reduced and the transmit power previously used by the user device for that wireless communication protocol may be reallocated to the other wireless communication protocol to decrease packet drop and/or the retransmission rate. For example, if a user device is capable of both LTE and 5G, if packet drop and/or retransmission rate is above a threshold for that user device when communication using LTE, channel assignment may be reduced for 5G and the transmit power previously used for 5G may be reallocated to LTE to reduce packet loss and/or the retransmission rate, which more effectively utilized network resources and creates a better user experience.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
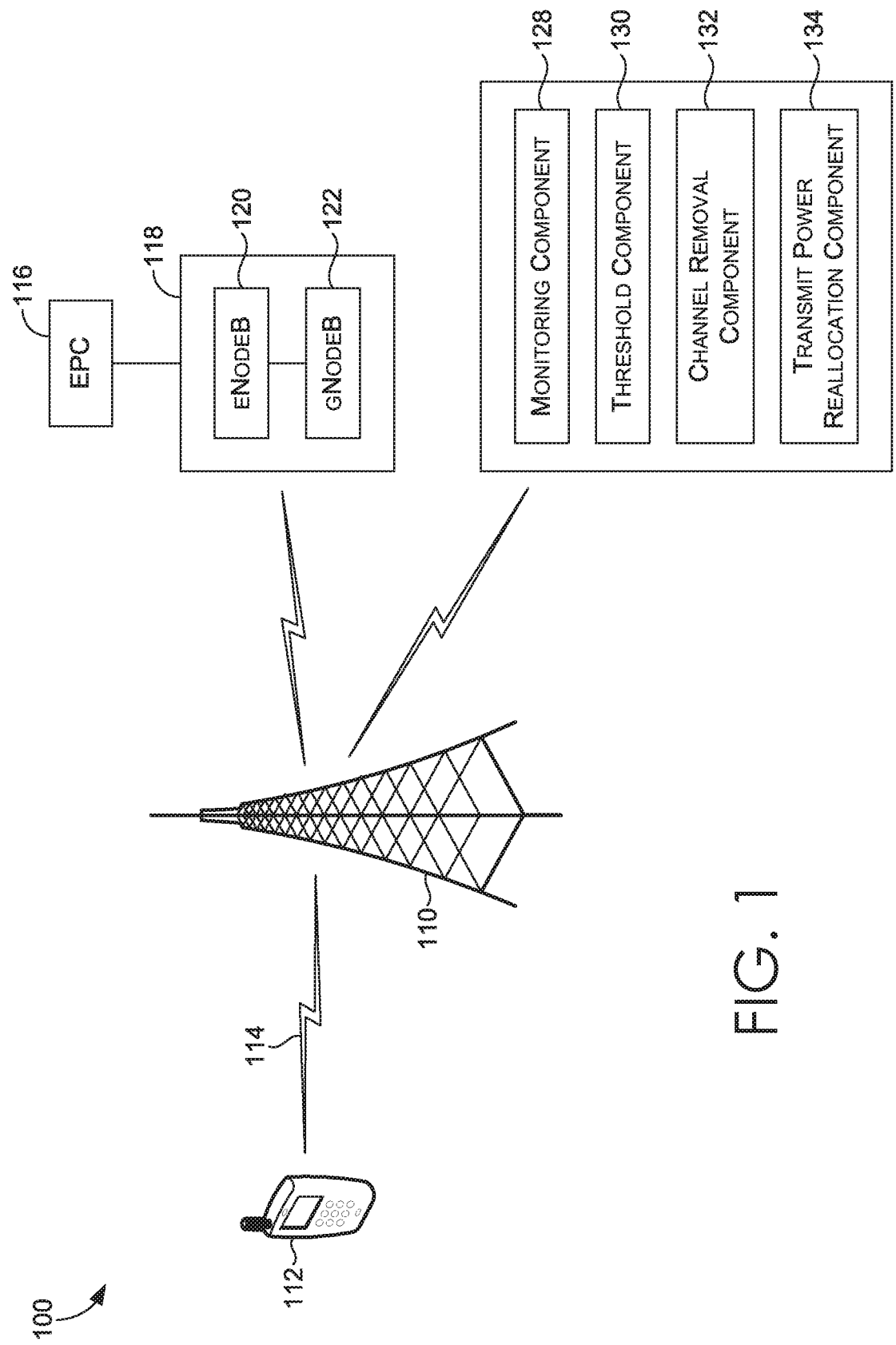
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a user device's transmission power ("transmit power") is the power utilized by the user device to transmit data from the user device to/through a wireless communications network. Each user device has a certain amount of transmit power available for user. When a user device is capable of communicating with two or more wireless communication protocols, a certain amount of transmit power is first allocated to the first wireless communication protocol (e.g., LTE) and the rest is allocated to the second wireless communication protocol (e.g., 5G). While typically transmit power is not dynamically reallocated between the two protocols, here, upon determining that packet drop and/or retransmission rate is above a threshold for one of the wireless communication protocols, the network (e.g., eNodeB, gNodeB) may determine that a channel associated with the other wireless communication protocol is to be dropped or channel assignment is reduced for that other wireless communication protocol, and thus that channel would no longer be used for communications with the user device. When this happens, the user device may then reallocate transmit power that was previously used for that wireless communication protocol to the other wireless communication protocol.

Even more, while traditionally transmit power of a user device may remain static, including an allocation of transit power between two or more services being used by a user device, aspects herein provide many advantages over a static allocation of transmit power.

Accordingly, a first aspect of the present disclosure is directed to a system for dynamically reallocating available transmit power on a dual connectivity user device. A system includes a processor and one or more computer storage hardware devices storing computer-usable instructions that, when used by the processor, cause the processor to perform various method steps. These steps include monitoring a retransmission rate for the user device that can simultaneously communicate using two or more wireless communication protocols. Further, it is determined that the retransmission rate for the user device is above a threshold for communications with a first wireless communication protocol. The other steps include reducing channel assignment of a second wireless communication protocol, and instructing the user device to reallocate a portion of the transmit power previously allocated for the second wireless communication protocol to the first wireless communication protocol.

A second aspect of the present disclosure is directed to a method for dynamically reallocating available transmit power on a dual connectivity user device. The method includes determining that at least one of a packet drop or a retransmission rate for a user device communicating with a first wireless communication protocol exceeds a threshold, the user device communicating with a wireless communications network using the first wireless communication protocol and a second wireless communication protocol. Further, the method includes reducing channel assignment for the second wireless communication protocol, and instructing the user device to reallocate transmit power previously allocated for the second wireless communication protocol to the first wireless communication protocol.

According to another aspect of the technology described herein, a method is provided for dynamically reallocating available transmit power on a dual connectivity user device. The method includes determining that at least one of a packet drop or a retransmission rate for a user device communicating using two or more wireless communication protocols with a wireless communications network is above a threshold. The at least one of the packet drop or the retransmission rate is above the threshold for a first wireless communication protocol. Further, the method includes removing use of at least one channel associated with a second wireless communication protocol of the two or more wireless communication protocols, and instructing the user device to reallocate the transmit power from the second wireless communication protocol to the first wireless communication protocol.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes user device 112, cell site 110 (which may be an access node, base station, or the like), transmission 114 and various network components. In network environment 100, user device 112 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with the cell site 110 in order to interact with a public or private network.

Figure 5:
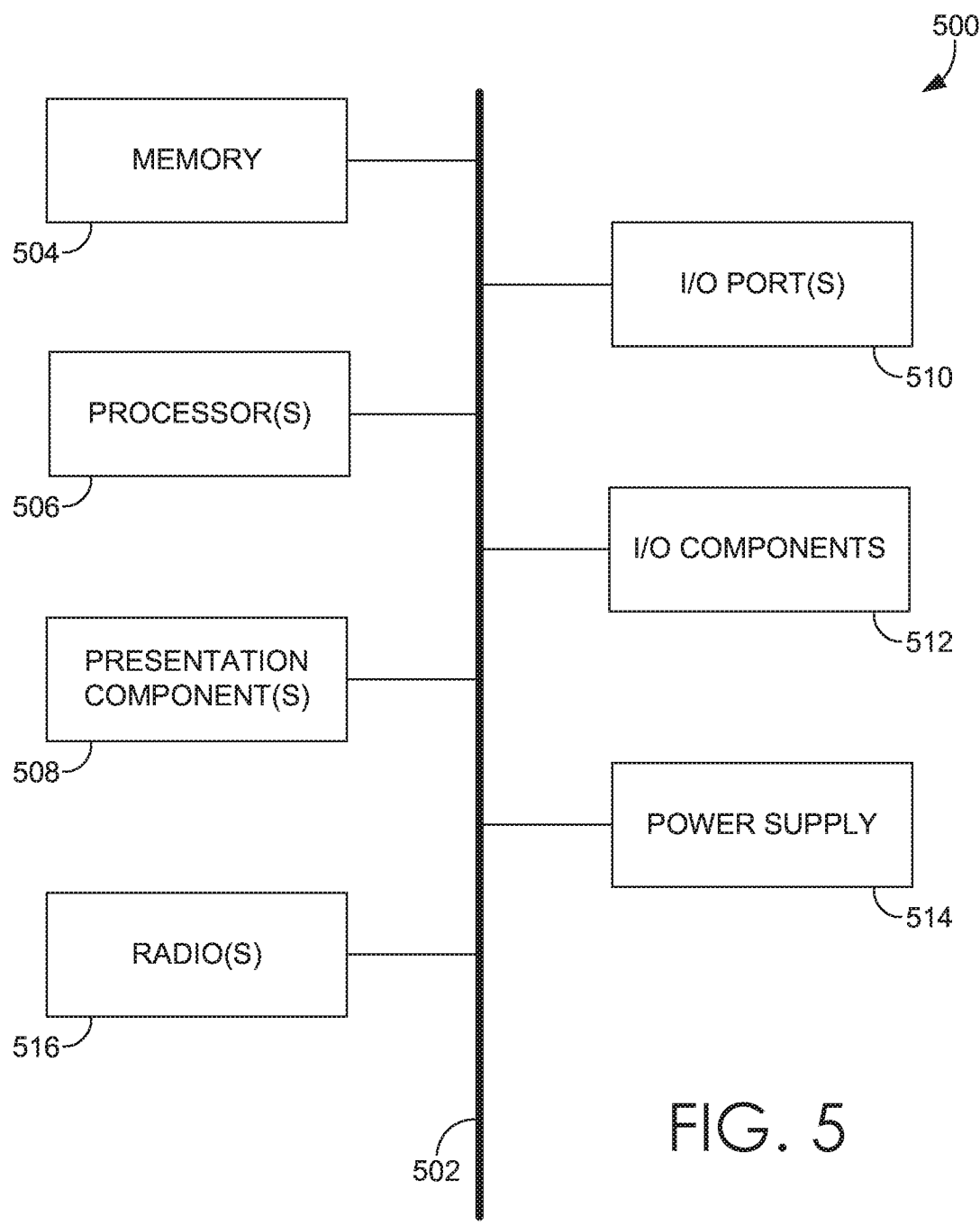
FIG. 5 depicts an exemplary computing environment suitable for use in implementations of the present disclosure.

In some aspects, the user device 112 may correspond to computing device 500 in FIG. 5. Thus, a user device can include, for example, a display(s), a power source(s) (e.g., a battery), a data store(s), a speaker(s), memory, a buffer(s), a radio(s) and the like. In some implementations, a user device (such as user device 112) comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, user device 112 in network environment 100 can optionally utilize a network (not shown) to communicate with other computing devices (e.g., a mobile device(s), a server(s), a personal computer(s), etc.) through cell site 110. The network may be a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. The network can include multiple networks, as well as being a network of networks, but is shown in more simple form so as to not obscure other aspects of the present disclosure.

The network can be part of a telecommunication network that connects subscribers to their immediate service provider. In some instances, the network can be associated with a telecommunications provider that provides services (e.g., voice, data, SMS) to user devices, such as user device 112. For example, the network may provide voice and non-voice services, including SMS, and/or data services to user devices or corresponding users that are registered or subscribed to utilize the services provided by a telecommunications provider. The network can comprise any communication network providing voice, SMS, and/or data service(s), such as, for example, a 1x circuit voice, a 3G network (e.g., CDMA, CDMA2000, WCDMA, GSM, UMTS), a 4G network (WiMAX, LTE, HSDPA), or a 5G network.

In some implementations, cell site 110 is configured to communicate with user devices, such as user device 112 that is located within the geographical area, or cell, covered by the one or more antennas of cell site 110. Cell site 110 may include one or more base stations, nodes, base transmitter stations, radios, antennas, antenna arrays, power amplifiers, transmitters/receivers, digital signal processors, control electronics, GPS equipment, and the like. In particular, user device 112 may communicate with cell site 110, according to any one or more of a variety of communication protocols, in order to access the network.

In aspects, user device 112 may be capable of communicating using 4G (e.g., LTE) and 5G. In some aspects, user device 112 may be an E-UTRAN New Radio-Dual Connectivity device (ENDC). ENDC allows the user device to connect to an LTE eNodeB that acts as a master node and a 5G gNodeB that acts as a secondary node. As such, in these aspects, user device 112 may access both LTE and 5G simultaneously, and in some cases, on the same spectrum band. As shown in FIG. 1, user device 112 communicates by way of transmission 114 with cell site 110 using one or more of LTE (associated with eNodeB 120) and 5G (associated with gNodeB 122), sometimes simultaneously. Additionally, other wireless communication protocols may be utilized in conjunction with aspects described herein, as LTE and 5G are used for exemplary purposes only and not for limitation.

In aspects, nodes 118 may work in conjunction with monitoring component 128, threshold component 130, channel removal component 132, and transmit power reallocation component 134. Monitoring component 128 may be responsible for monitoring packet drop and/or a retransmission rate for at least one user device served by cell site 110. As mentioned, user device 112 may simultaneously communicating using two or more wireless communication protocols, such as LTE and 5G. Threshold component 130 receives information from monitoring component 128 and determines when a threshold has been met with respect to the packet drop and/or retransmission rate of a user device, such as user device 112. Once a particular threshold has been met, meaning that too many packets are being dropped or retransmissions are too high for a particular period of time causing a waste of network resources and a poor user experience, channel removal component 132 may communicate to another network component to reduce channel assignment or remove an existing channel from the wireless communication protocol without the packet drop and/or retransmission rate issues. Transmit power reallocation component 134 may then communicate to one or more of a network component or user device 112 to reallocate user device's 112 transmit power from the wireless communication protocol without the packet drop and/or retransmission rate issues to the wireless communication protocol having the issues. The advantage of this is that by allocating more transmit power to the wireless communication protocol with the high packet drop and/or retransmission rate, the packet drop and/or retransmission rate will drop, providing for a more efficient use of network resources and a better user experience.

For exemplary purposes, if user device 112 is experiencing high packet drop and/or a retransmission rate above a threshold in its communications using LTE, a node 118, such as eNodeB 120 or gNodeB 122 may determine that channel assignment should be reduced on 5G, which would then allow for transmit power of user device 112 to dynamically be reallocated from 5G to LTE. This would improve the packet drop and/or retransmission rate issues on the LTE side by focusing more transmit power on that wireless communication protocol. In some aspects, user device 112 is capable of carrier aggregation on both LTE and 5G radio access technologies. In this aspect, in the event of high packet drop and/or retransmission rate above a certain threshold on LTE on all of the carrier aggregation channels, the eNodeB 120 may dynamically notify the gNodeB 122 to delay the 5G channel addition that is part of 5G carrier aggregation so that the additional transmit power meant for carrier aggregation on 5G can be reassigned to LTE.

Alternatively, rather than reducing channel assignment on 5G, if packet drop and/or retransmission rate is higher than a second threshold, which may be higher than the threshold used for reduced channel assignment, the gNodeB may remove or tear down an existing 5G channel so that the current transmit power allocated to that channel can be reassigned to LTE.

Figure 2:
FIG. 2 depicts a diagram of transmit power allocation between two wireless communication protocols.

FIG. 2 depicts a diagram 200 of transmit power allocation between two wireless communication protocols. Power allocation area 210 illustrates that, in one aspect, 26 dBm of total transmit power may be available for a particular user device to allocate between two or more wireless communication protocols, such as LTE and 5G. Many different arrangements are illustrated of how total transmit may be allocated between two wireless communication protocols. For example, FIG. 2 illustrates that 25.4 dBm may be allocated to LTE, while 17 dBm is allocated to 5G. LTE is shown with three channels, LTE channel 1 212, LTE channel 2 214, and LTE channel 3 216. Additionally, 5G is illustrated as having 5G NR channel 1 218, and 5G NR channel 2 220.

Using FIG. 2 as a reference for an example, if it is determined that packet drop and/or retransmission rate has met a threshold for a particular user device for LTE transmissions, the eNodeB and/or gNodeB may be notified of the issue. One action that may be taken is to reduce channel assignment or tear down an existing channel on the 5G side, 5G NR channel 2 220 as illustrated in FIG. 2, such that the transmit power used for 5G NR channel 2 220 can be dynamically reallocated to LTE and used for one or more of the LTE channels (212, 214, 216). Providing LTE with more transmit power, in aspects, may correct the issue with the high packet drop and/or retransmission rate, thus utilizing network resources more efficiently and providing a better user experience. In some aspects, 5G NR channel 2 220 may already be in use when it is removed/torn down, or may be assigned to 5G but not yet in use. In either scenario, the transmit power is reallocated from 5G to use with LTE.

Figure 3:
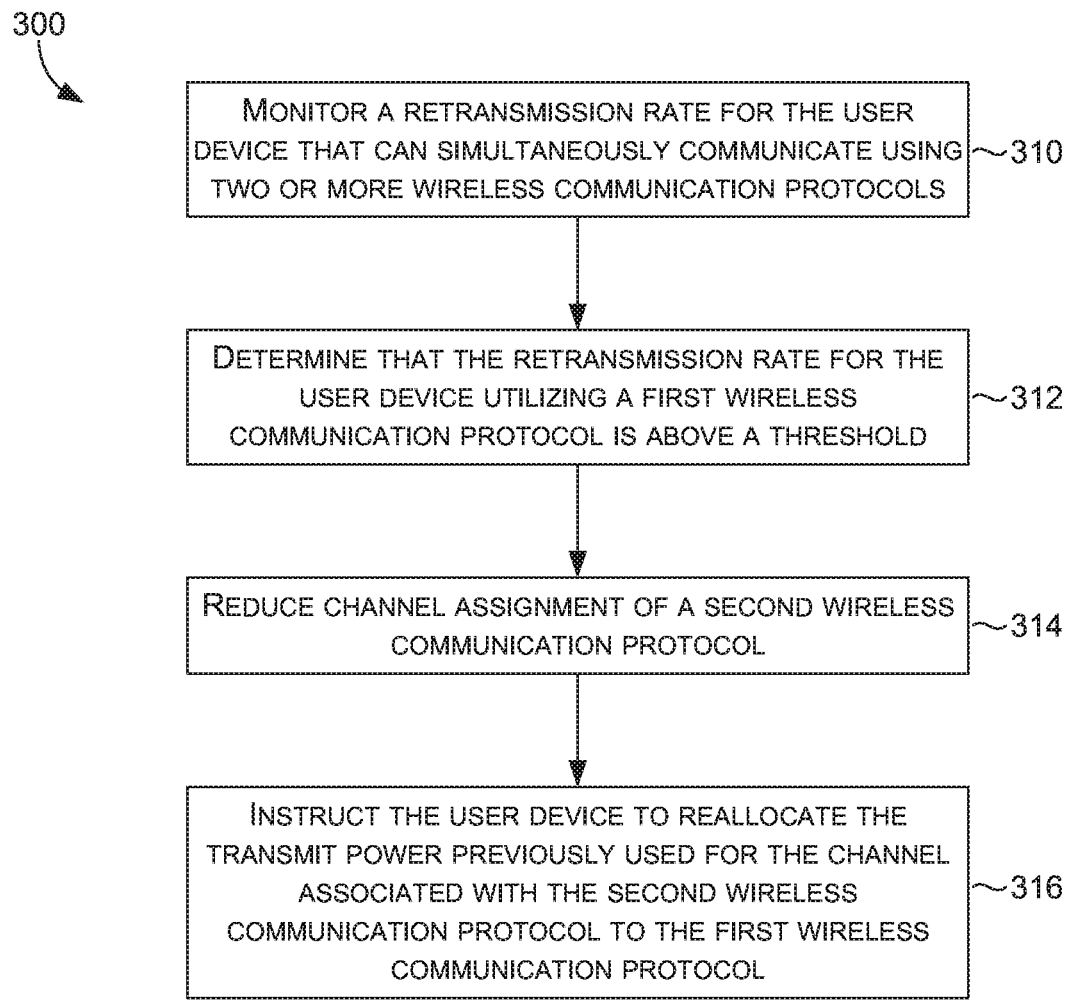
FIG. 3 depicts a flow diagram of an exemplary method for dynamically reallocating transmit power on a dual connectivity user device, in accordance with an aspect herein.

Turning now to FIG. 3, a flow diagram is depicted of an exemplary method 300 for dynamically reallocating transmit power on a dual connectivity user device, in accordance with an aspect herein. Initially, at block 310, a retransmission rate is monitored for a user device that can simultaneously communicate using two or more wireless communication protocols. For example, a user device may utilize both LTE and 5G for communications with the wireless communications network. At block 312, it is determined that the retransmission rate for the user device utilizing a first wireless communication protocol is above a threshold. Generally, retransmission rate indicates the resending of packets that have been either damaged or lost during transmission. A high retransmission rate or packet drop indicates that there are issues efficiently delivering packets to/from a mobile device from the wireless communications network.

At block 314, channel assignment is reduced for the second wireless communication protocol. Because the high packet drop and/or retransmission rate is associated with the first wireless communication protocol, aspects reduce channel assignment for the other wireless communication protocol to redirect resources from the second to the first wireless communication protocol. At block 316, the user device is instructed to reallocate the transmit power previously used for the second wireless communication protocol to one or more channels associated with the first wireless communication protocol. In aspects, this provides more transmit power to the wireless communication protocol experiencing high packet drop and/or retransmission rate for the user device, which helps to fix these issues, lowering packet drop and/or retransmission rates.

Figure 4:
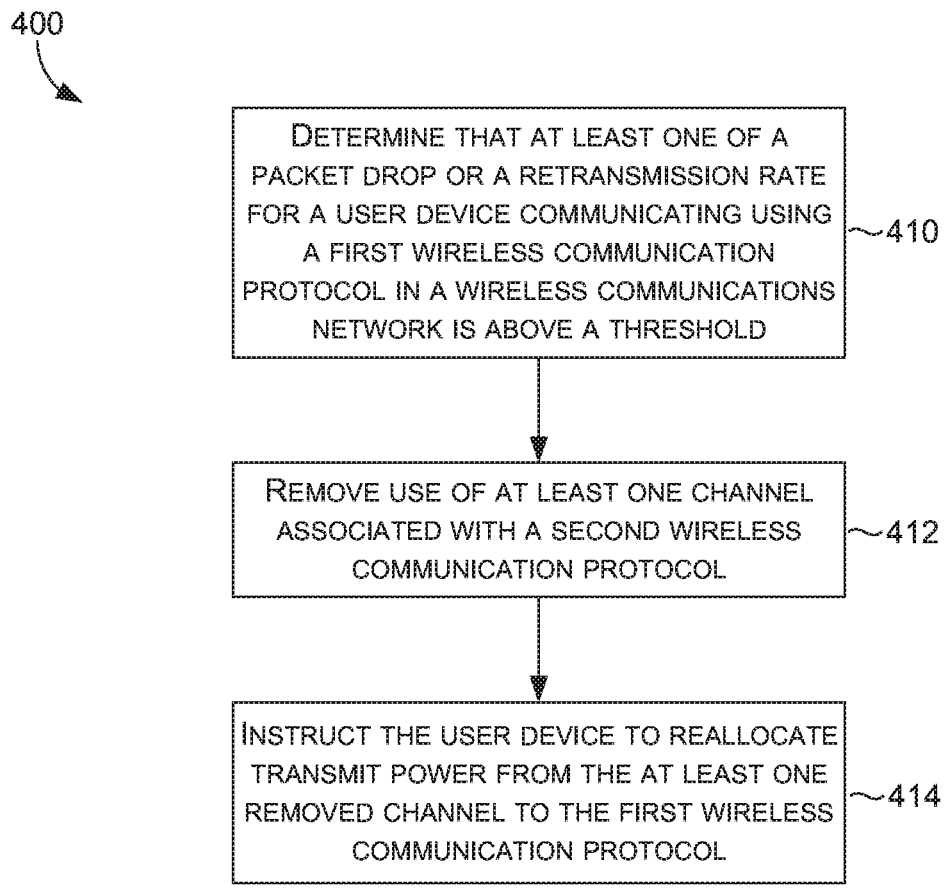
FIG. 4 depicts a flow diagram of another exemplary method for dynamically reallocating transmit power on a dual connectivity user device, in accordance with an aspect herein.

FIG. 4 depicts a flow diagram of another exemplary method 400 for dynamically reallocating transmit power on a dual connectivity user device, in accordance with an aspect herein. At block 410, it is determined that packet drop and/or retransmission rate for a user device communication using a first wireless communication protocol in a wireless communications network is above a threshold. At block 412, channel assignment is reduced for a second wireless communication network. At block 414, the user device is instructed to reallocate transmit power from the second wireless communication protocol to the first wireless communication protocol. For example, if the high packet drop and/or retransmission rate is on the LTE network, channel assignment may be reduced on the 5G network, thus not as many channels will be assigned to 5G as originally planned. Alternatively, an existing channel could be removed/torn down from the 5G network. In either scenario, the transmit power that was used or was going to be used for that channel in 5G is reallocated to one or more channels in the LTE network, with a goal of improving the packet drop and/or retransmission rate in LTE.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for dynamically reallocating available transmit power on a dual connectivity user device, the system comprising:
    a processor; and
    one or more computer storage hardware devices storing computer-usable instructions that, when used by the processor, cause the processor to:
    monitor a retransmission rate for the user device that can simultaneously communicate using two or more wireless communication protocols;
    determine that the retransmission rate for the user device is above a threshold for communications with a first wireless communication protocol;
    reduce channel assignment of a second wireless communication protocol; and
    instruct the user device to reallocate a portion of the transmit power previously allocated for the second wireless communication protocol to the first wireless communication protocol;
    wherein the reduced channel assignment of the second wireless communication protocol comprises removing an existing channel from the second wireless communication protocol.

2. The system of claim 1, wherein the first wireless communication protocol is LTE and the second wireless communication protocol is 5G.

3. The system of claim 1, wherein the reduced channel assignment of the second wireless communication protocol results in less transmit power needed for the second wireless communication protocol.

4. The system of claim 1, wherein the reduced channel assignment disables use of carrier aggregation for the second wireless communication protocol.

5. The system of claim 1, wherein a gNodeB or eNodeB associated with a cell site in a wireless communications network instructs the user device to reallocate the transmit power.

6. The system of claim 2, wherein the transmit power is reallocated from 5G to 4G.

7. A method for dynamically reallocating available transmit power on a dual connectivity user device, the method comprising:
    determining that at least one of a packet drop or a retransmission rate for a user device communicating with a first wireless communication protocol exceeds a threshold, the user device communicating with a wireless communications network using the first wireless communication protocol and a second wireless communication protocol;
    reducing channel assignment for the second wireless communication protocol; and
    instructing the user device to reallocate transmit power previously allocated for the second wireless communication protocol to the first wireless communication protocol;
    wherein reducing channel assignment removes an existing channel from the second wireless communication protocol.

8. The method of claim 7, wherein reducing channel assignment disables use of carrier aggregation for the second wireless communication protocol.

9. The method of claim 7, wherein a gNodeB or eNodeB associated with the wireless communications network instructs the user device to reallocate the transmit power.

10. The method of claim 7 wherein the reallocated transmit power is used for the at least one channel associated with LTE.

11. A method for dynamically reallocating available transmit power on a dual connectivity user device, the method comprising:
    determining that at least one of a packet drop or a retransmission rate for a user device communicating using two or more wireless communication protocols with a wireless communications network is above a threshold, wherein the at least one of the packet drop or the retransmission rate is above the threshold for a first wireless communication protocol;
    removing use of at least one channel associated with a second wireless communication protocol of the two or more wireless communication protocols; and
    instructing the user device to reallocate the transmit power from the second wireless communication protocol to the first wireless communication protocol;
    wherein removing use of at least one channel associated with the second wireless communication protocol disables use of carrier aggregation for the second wireless communication protocol.

12. The method of claim 11, wherein a gNodeB or eNode B associated with the wireless communications network instructs the user device to reallocate the transmit power.

13. The method of claim 11, wherein removing the use of at least one channel further comprises assigning a single carrier for the second wireless communication protocol.

14. The method of claim 11, wherein both the first wireless communication protocol and the second wireless communication protocol are capable of carrier aggregation.

15. The method of claim 14, wherein the at least one of the packet drop or the retransmission rate is above the threshold on all carrier aggregation channels.

16. The method of claim 11, wherein the first wireless communication protocol is LTE and the second wireless communication protocol is 5G.

17. The method of claim 11, wherein removing the use of the at least one channel associated with the second wireless communication protocol leaves one remaining channel on the second wireless communication protocol.

\* \* \* \* \*